United States Patent [19]
Gleason et al.

[11] Patent Number: 6,164,714
[45] Date of Patent: Dec. 26, 2000

[54] FLEXIBLE TOP WITH AIR CELLS

[75] Inventors: Mark E. Gleason, Farmington Hills; Partha Datta, Southfield, both of Mich.

[73] Assignee: DaimlerChrysler Corporation, Auburn Hills, Mich.

[21] Appl. No.: 09/400,355

[22] Filed: Sep. 20, 1999

[51] Int. Cl.[7] ........................................................ B60J 7/08
[52] U.S. Cl. ........................................ 296/107.1; 296/212
[58] Field of Search ................................ 296/107.1, 212, 296/180.1, 180.5; 180/903

[56] References Cited

U.S. PATENT DOCUMENTS

| | | | |
|---|---|---|---|
| 2,833,593 | 5/1958 | Olivier et al. | 296/107.1 |
| 2,838,341 | 6/1958 | Watson | 296/107.1 |
| 4,998,766 | 3/1991 | Biermacher et al. . | |
| 5,040,557 | 8/1991 | Morgan | 296/136 |
| 5,076,632 | 12/1991 | Surratt . | |
| 5,080,428 | 1/1992 | Rouland . | |
| 5,297,837 | 3/1994 | Burst et al. | 296/107.1 |
| 5,509,712 | 4/1996 | Rausch et al. . | |
| 5,527,081 | 6/1996 | Rausch et al. . | |
| 5,803,529 | 9/1998 | Perry-Bores et al. . | |

FOREIGN PATENT DOCUMENTS 2700993  8/1994  France ................................. 296/180.1

*Primary Examiner*—D. Glenn Dayoan
*Assistant Examiner*—Jason Morrow
*Attorney, Agent, or Firm*—Roland A. Fuller, III

[57] ABSTRACT

A flexible top for a motor vehicle is provided. The flexible top includes an outer surface, an inner surface, a plurality of air cells coupled between the inner and outer surfaces along the length of the flexible top and a plurality of air inlet ports coupled to the plurality of longitudinal air cells. Operation of the vehicle above a predetermined speed causes air to be forced over an air scoop device which directs a portion of the air over the outer surface as well and another portion of the air into the plurality of air inlet ports. Air flowing into the plurality of air inlet ports flows and into the plurality of longitudinal air cells, inflating and pressurizing the plurality of air cells and tending to separate the outer and inner surfaces to provide the flexible top with increased rigidity. When inflated, the plurality of air cells provide the outer surface with an air foil-like longitudinal cross-section that further enhances the resistance of the flexible top to vibration and flapping.

18 Claims, 2 Drawing Sheets

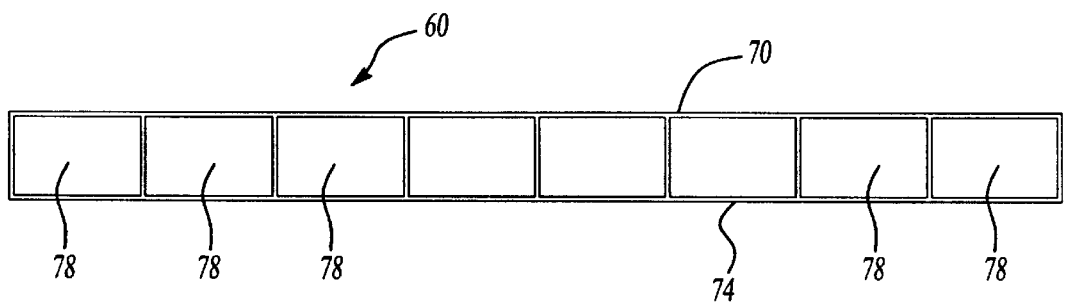
*Fig-3*
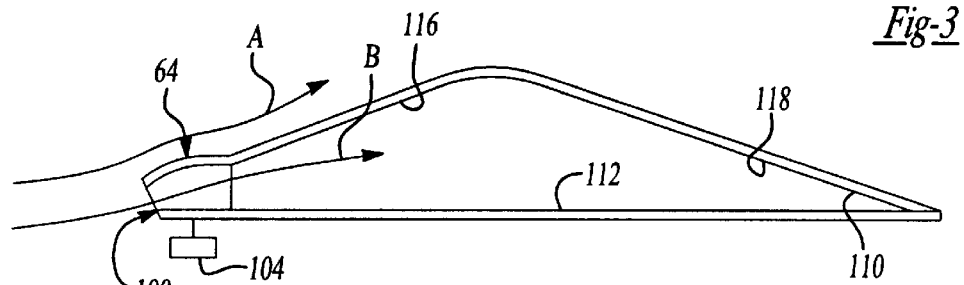
*Fig-4*
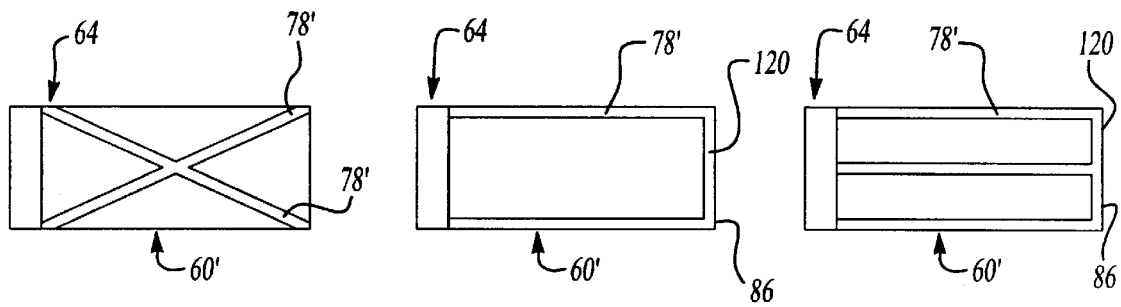
*Fig-5A*  *Fig-5B*  *Fig-5C*
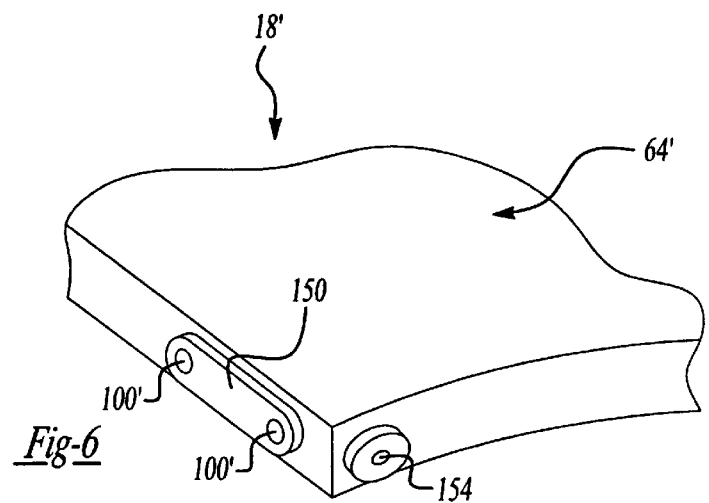
*Fig-6*

FLEXIBLE TOP WITH AIR CELLS

BACKGROUND OF THE INVENTION

1. Technical Field

The present invention relates generally to motor vehicles. More particularly, the present invention relates to flexible vehicle body panels. More specifically, but without restriction to the particular embodiment and/or use which is shown and described for the purposes of illustration, the present invention relates to a flexible top for a motor vehicle.

2. Discussion

The use of convertible tops is well documented in the automotive industry. Convertible tops permit the vehicle occupants to raise and lower a vehicle cover structure depending upon the weather and the conditions under which the vehicle is to be operated. While the ability to lower the vehicle cover structure greatly enhances the pleasure one may obtain from operating a vehicle, several drawbacks have been noted.

One such drawback concerns the material from which such cover structures are fabricated. The materials that are frequently employed are flexible woven or non-woven fabrics having a single-ply, which permit the convertible top to be folded or rolled so as to occupy minimal space when it is not raised. As these materials are highly flexible, they typically do not provide the cover structure with any significant rigidity in and of themselves. Consequently, these materials are highly susceptible to wind forces, which cause the cover structure to vibrate and flap, which in turn creates a substantial amount of noise within the vehicle passenger compartment.

Sophisticated convertible tops have been developed which include a plurality of cross-members and supports which apply tension to various areas of the cover structure. While this approach has provided some reduction in the amount of noise created by the vibration and flapping of the cover structure, the resulting convertible top is typically bulkier and more costly to manufacture.

SUMMARY OF THE INVENTION

It is one object of the present invention to provide a flexible top for a motor vehicle that is resistant to vibration and flapping which results from wind forces.

It is another object of the present invention to provide a flexible top for a motor vehicle that utilizes ram air to improve the rigidity of the cover structure.

It is yet another object of the present invention to provide a flexible top for a motor vehicle that utilizes an air scoop structure to provide a source of ram air.

It is a further object of the present invention to provide a flexible top for a motor vehicle that utilizes an inflatable cover structure having an airfoil shape when inflated.

A flexible top for a motor vehicle is provided. The flexible top includes an outer surface, an inner surface, a plurality of air cells coupled between the inner and outer surfaces along the length of the flexible top and a plurality of air inlet ports coupled to the plurality of longitudinal air cells. Operation of the vehicle above a predetermined speed causes air to be forced over an air scoop device which directs a portion of the air over the outer surface as well and another portion of the air into the plurality of air inlet ports. Air flowing into the plurality of air inlet ports flows into the plurality of longitudinal air cells, inflating and pressurizing the plurality of air cells and tending to separate the outer and inner surfaces to provide the flexible top with increased rigidity. When inflated, the plurality of air cells provides the outer surface with an air foil-like longitudinal cross-section that further enhances the resistance of the flexible top to vibration and flapping.

Additional advantages and features of the present invention will become apparent from the subsequent description and the appended claims, taken in conjunction with the accompanying drawings.

BRIEF DESCRIPTION OF THE DRAWINGS

FIG. 3 is a cross-sectional view taken along the line 3—3 of FIG. 2;

FIG. 4 is a cross-sectional view taken along the line 4—4 of FIG. 2;

FIG. 5 is a top view of the closure structure showing several alternate air cell constructions; and FIG. 6 is a view of a portion of a vehicle constructed in accordance with the teachings of an alternate embodiment of the present invention.

DETAILED DESCRIPTION OF THE PREFERRED EMBODIMENT

Figure 1:
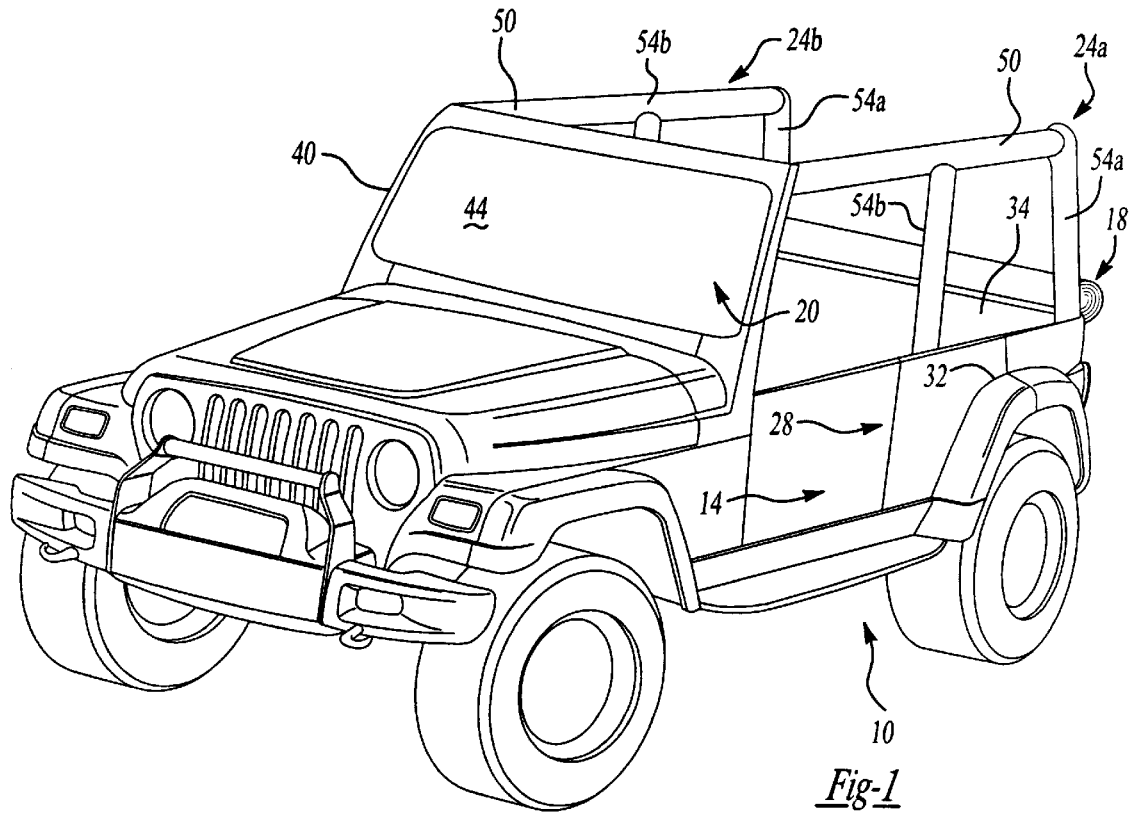
FIG. 1 is a side perspective view of a vehicle constructed in accordance with the teachings of a preferred embodiment of the present invention illustrating the cover structure in a lowered condition.
Figure 2:
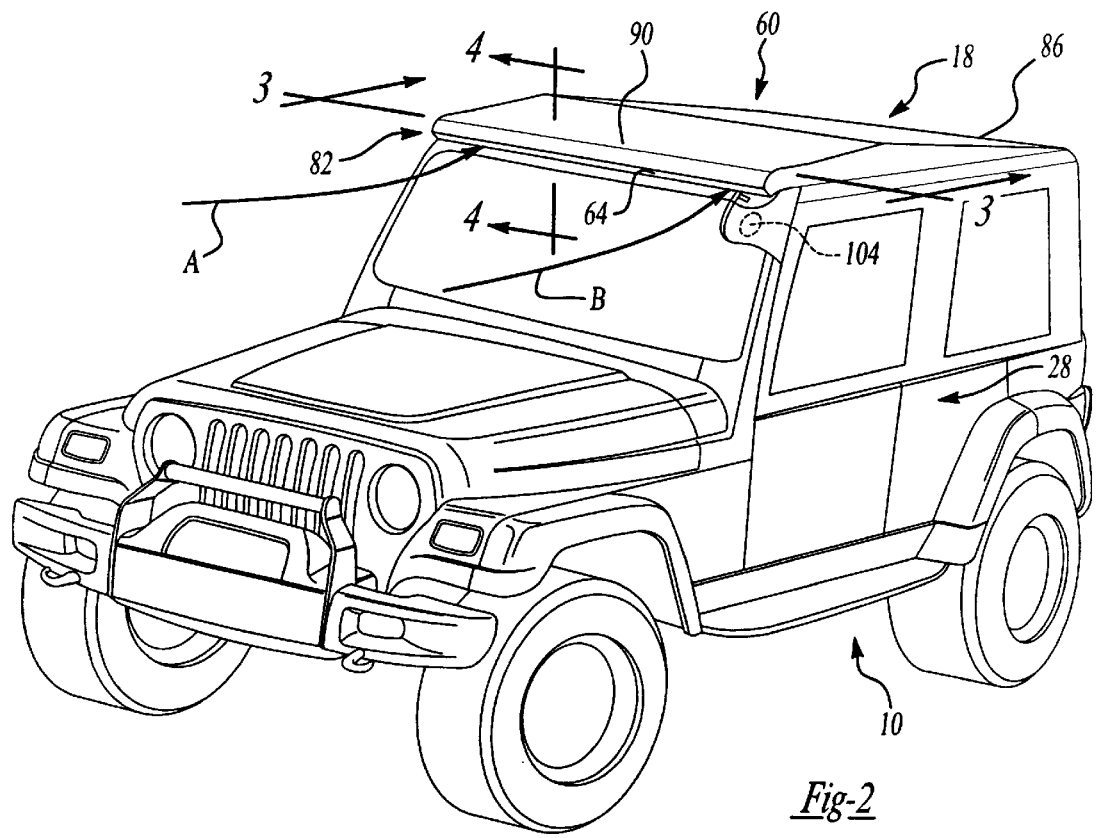
FIG. 2 is a side perspective view of the vehicle of FIG. 1 illustrating the cover structure in a raised condition.

With reference to FIGS. 1 and 2 of the drawings, a motor vehicle constructed in accordance with the teachings of the preferred embodiment of the present invention is generally identified at reference numeral 10. As will be discussed in greater detail below, vehicle 10 includes a vehicle body 14 and a closure structure 18, which may be articulated between an open position as illustrated in FIG. 1 and a closed position as illustrated in FIG. 2. While the drawings illustrate a particular vehicle, it will be understood that the teachings of the present invention have applicability to other types of vehicles.

In FIG. 1, vehicle body 14 is shown to include a windshield assembly 20, first and second lateral body members 24a, 24b and an a cargo box 28 having a pair of laterally spaced apart side members 32 and a rear side member 34 coupled thereto. Windshield assembly 20 includes a frame structure 40 and a windshield 44. First and second lateral body members 24a, 24b each include a raised horizontal structural member 50 which extend along axes parallel to the longitudinal axis of vehicle 10. A plurality of vertical structural members 54 extend downwardly from the horizontal structural members 50, coupling the horizontal structural members 50 to cargo box 28. As illustrated, vehicle body 14 is shown to be container-like, having an open top and partially open sides.

Closure structure 18 is shown in a lowered condition wherein it is rolled and fastened to rearward vertical structures 54a. With additional reference to FIGS. 2 through 4, closure structure 18 is shown to include a cover structure 60 and an air scoop structure 64. Cover structure 60 is shown to include an outer surface 70, an inner surface 74 and a plurality of longitudinal air cells 78. Outer and inner surfaces 70 and 74 are each formed from one or more flexible woven or non-woven materials and may be dissimilar. Outer surface 70 may be formed from a breathable material, such as GORTEX®, which inhibits a flow of liquid water therethrough but permits a flow of water vapor therethrough. In the particular embodiment illustrated, each of the plurality of longitudinal air cells 78 extends along an axis parallel to the longitudinal axis of vehicle 10. Each of the plurality of longitudinal air cells 78 are open at their forward end 82 and closed at their rearward end 86. Cover structure 60 is coupled at its forward edge 90 to air scoop structure 64.

Air scoop structure 64 is a rigid member having a plurality of air inlet ports 100 which are in fluid communication with the plurality of longitudinal air cells 78. Air scoop structure 64 is releasably coupled to windshield assembly 20 through latch mechanism 104 and is operable for directing first and second air flows A and B, respectively. First air flow A is directed over windshield assembly 20 in a predetermined manner. This function of air scoop structure 64 is largely conventional in nature and need not be discussed in detail. Second air flow B is directed into the plurality of longitudinal air cells 78, causing them to pressurize and inflate, thereby separating outer surface 70 from inner surface 74 when vehicle 10 is moving in a forward direction.

Preferably, each of the plurality of longitudinal air cells 78 includes an upper cell surface 110 and a generally horizontal lower cell surface 112. Upper cell surface 110 is shown in FIG. 4 to have an aerodynamically curved convex profile. Typically, the profile of upper cell surface 110 is determined by the vehicle air flow characteristics. Construction of the plurality of longitudinal air cells 78 in this manner provides cover structure 60 with a contoured air foil-like cross-section when inflated which further reduces wind noise, vibration and flapping.

In use, operation of the vehicle 10 above, a predetermined speed causes air to be forced over air scoop structure 64. Air scoop structure 64 directs a portion of the air into the plurality of inlet ports 100 and into the plurality of longitudinal air cells 78. As a result, air cells 78 inflate and pressurize tending to separate outer and inner surfaces 70 and 74 to provide increased rigidity.

While the closure structure 18 has been described thus far as having a plurality of longitudinal air cells which extend along an axis generally parallel the longitudinal axis of vehicle 10, those skilled in the art will appreciate that the invention, in its broader aspects, may be constructed somewhat differently. For example, the plurality of longitudinally extending air cells may be formed as shown in FIG. 5. As shown, a lateral air cell 120 may be formed in cover structure 18 which is in fluid connection with one or more of the plurality of longitudinal air cells 78' along rearward end 86'.

Similarly, while the longitudinal air cells 78 have been described thus far as being in open fluid communication with the air outside vehicle 10, those skilled in the art will appreciate that the invention, in its broader aspects, may be constructed somewhat differently. For example, check valves 150 may be incorporated into air scoop structure 64' as shown in FIG. 6.

In this arrangement, check valves 150 are operable for permitting air to flow through the plurality of air inlet ports 100' when vehicle 10' is operated in a forward direction. However, check valves 150 are also operable for inhibiting air from flowing out of the plurality of longitudinal air cells 78 through air inlet ports 100'. Construction of closure structure 18' in this manner permits closure structure 18' to retain its shape at varying operating conditions, such as when vehicle 10' is stopped or operated in reverse. If the vehicle operator desires to place closure structure 18' in the retracted position, a release valve 154 may be operated to purge pressurized air from the plurality of longitudinal air cells 78.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A closure structure for a motor vehicle comprising:

an outer surface;

an inner surface;

a plurality of longitudinal air cells coupled between the inner and outer surfaces along the length of the closure structure;

a lateral air cell coupled between the inner and outer surfaces and extending laterally to the longitudinal axis of the closure structure, the plurality of longitudinal air cells in fluid connection with the lateral air cell; and a plurality of air inlet ports coupled to the longitudinal air cells, the plurality of air inlet ports adapted to intake air into the plurality of longitudinal air cells through operation of the motor vehicle in a forward direction.

2. A closure structure for a motor vehicle comprising:

an outer surface;

an inner surface;

a plurality of longitudinal air cells coupled between the inner and outer surfaces along the length of the closure structure; and a plurality of air inlet ports formed into a rigid air scoop structure operable for directing a flow of air over the closure structure in a predetermined manner, the air scoop structure coupled to the longitudinal air cells, the plurality of air inlet ports adapted to intake air into the plurality of longitudinal air cells through operation of the motor vehicle in a forward direction.

3. A closure structure for a motor vehicle comprising:

an outer surface;

an inner surface;

a plurality of longitudinal air cells coupled between the inner and outer surfaces along the length of the closure structure;

a plurality of air inlet ports coupled to the longitudinal air cells, the plurality of air inlet ports adapted to intake air into the plurality of longitudinal air cells through operation of the motor vehicle in a forward direction; and a check valve mechanism in fluid connection with the plurality of air inlet ports, the check valve mechanism operable for inhibiting a flow of air from the plurality of longitudinal air cells to the plurality of air inlet ports.

4. A vehicle comprising:

a vehicle body defining an aperture; and a closure structure coupled to the vehicle body and selectively positionable in an open position substantially clearing the aperture and a closed position substantially closing the aperture, the closure structure including an outer surface, an inner surface, a plurality of longitudinal air cells coupled between the inner and outer surfaces along the length of the closure structure, a lateral air cell coupled between the inner and outer surfaces and extending laterally to the longitudinal axis of the closure structure, the plurality of longitudinal air cells in fluid connection with the lateral air cell, and a plurality of air inlet ports coupled to the longitudinal air cells, the plurality of air inlet ports adapted to intake air into the plurality of longitudinal air cells through operation of the motor vehicle in a forward direction.

5. A vehicle comprising:

a vehicle body defining an aperture; and a closure structure coupled to the vehicle body and selectively positionable in an open position substantially clearing the aperture and a closed position substantially closing the aperture, the closure structure including an outer surface, an inner surface, a plurality of longitudinal air cells coupled between the inner and outer surfaces along the length of the closure structure and a plurality of air inlet ports coupled to the longitudinal air cells, the plurality of air inlet ports formed into a rigid air scoop structure operable for directing a flow of air over the closure structure in a predetermined manner, the plurality of air inlet ports adapted to intake air into the plurality of longitudinal air cells through operation of the motor vehicle in a forward direction.

6. A vehicle comprising:

a vehicle body defining an aperture; and a closure structure coupled to the vehicle body and selectively positionable in an open position substantially clearing the aperture and a closed position substantially closing the aperture, the closure structure including an outer surface, an inner surface, a plurality of longitudinal air cells coupled between the inner and outer surfaces along the length of the closure structure, a plurality of air inlet ports coupled to the longitudinal air cells, the plurality of air inlet ports adapted to intake air into the plurality of longitudinal air cells through operation of the motor vehicle in a forward direction and a check valve mechanism in fluid connection with the plurality of air inlet ports, the check valve mechanism operable for inhibiting a flow of air from the plurality of longitudinal air cells to the plurality of air inlet ports.

7. The closure structure of claim 1, wherein the outer surface is at least partially formed from a flexible and breathable material which inhibits a flow of liquid water therethrough but permits a flow of water vapor therethrough.

8. The closure structure of claim 1, wherein each of the plurality of longitudinal air cells includes an upper cell surface having an aerodynamically curved convex profile.

9. The closure structure of claim 2, wherein the outer surface is at least partially formed from a flexible and breathable material which inhibits a flow of liquid water therethrough but permits a flow of water vapor therethrough.

10. The closure structure of claim 2, wherein each of the plurality of longitudinal air cells includes an upper cell surface having an aerodynamically curved convex profile.

11. The closure structure of claim 3, wherein the outer surface is at least partially formed from a flexible and breathable material which inhibits a flow of liquid water therethrough but permits a flow of water vapor therethrough.

12. The closure structure of claim 3, wherein each of the plurality of longitudinal air cells includes an upper cell surface having an aerodynamically curved convex profile.

13. The vehicle of claim 4, wherein the outer surface is at least partially formed from a flexible and breathable material which inhibits a flow of liquid water therethrough but permits a flow of water vapor therethrough.

14. The vehicle of claim 4, wherein each of the plurality of longitudinal air cells includes an upper cell surface having an aerodynamically curved convex profile.

15. The vehicle of claim 5, wherein the outer surface is at least partially formed from a flexible and breathable material which inhibits a flow of liquid water therethrough but permits a flow of water vapor therethrough.

16. The vehicle of claim 5, wherein each of the plurality of longitudinal air cells includes an upper cell surface having an aerodynamically curved convex profile.

17. The vehicle of claim 6, wherein the outer surface is at least partially formed from a flexible and breathable material which inhibits a flow of liquid water therethrough but permits a flow of water vapor therethrough.

18. The vehicle of claim 6, wherein each of the plurality of longitudinal air cells includes an upper cell surface having an aerodynamically curved convex profile.

* * * * *